United States Patent
Pathria et al.

(10) Patent No.: US 7,379,880 B1
(45) Date of Patent: May 27, 2008

(54) CASCADED PROFILES FOR MULTIPLE INTERACTING ENTITIES

(75) Inventors: Anu K. Pathria, La Jolla, CA (US); Louis S. Biafore, San Diego, CA (US); Jean de Traversay, Solana Beach, CA (US); Arati S. Deo, San Diego, CA (US); Ho Ming Luk, San Diego, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 634 days.

(21) Appl. No.: 09/606,575

(22) Filed: Jun. 28, 2000

Related U.S. Application Data

(60) Provisional application No. 60/146,209, filed on Jul. 28, 1999.

(51) Int. Cl.
*G06Q 30/00* (2006.01)
(52) U.S. Cl. .................................................. 705/1
(58) Field of Classification Search .............. 705/14, 705/2, 3, 10; 725/46; 701/57
See application file for complete search history.

(56) References Cited

U.S. PATENT DOCUMENTS

| | | | | |
|---|---|---|---|---|
| 5,324,077 A | * | 6/1994 | Kessler et al. | 283/54 |
| 5,557,514 A | | 9/1996 | Seare et al. | 364/401 |
| 5,577,169 A | * | 11/1996 | Prezioso | 395/61 |
| 5,754,939 A | | 5/1998 | Herz et al. | 455/4.2 |
| 5,819,226 A | * | 10/1998 | Gopinathan et al. | 705/44 |
| 5,835,897 A | | 11/1998 | Dang | 705/2 |
| 5,915,241 A | | 6/1999 | Giannini | 705/2 |
| 5,956,690 A | | 9/1999 | Haggerson et al. | 705/3 |
| 5,970,463 A | | 10/1999 | Cave et al. | 705/3 |
| 6,014,633 A | | 1/2000 | DeBusk et al. | 705/7 |
| 6,038,388 A | | 3/2000 | Hogden et al. | 395/500.27 |
| 6,253,186 B1 | | 6/2001 | Pendleton, Jr. | 705/2 |

OTHER PUBLICATIONS

Tim Novak, Edgar Signs Measure to Overhaul Medicaid in Illinois Welfare Recipients would get Managed Health Care, St. Louis Dispatch, Jul. 27, 1994 (Dialog: File 494: 07708106).*
McCormack, John Data Mining: Digging for Real Answers, Health Data Management Apr. 1998 (Dialog file 13:00573973).*

* cited by examiner

*Primary Examiner*—James Myhre
*Assistant Examiner*—Daniel Lastra
(74) *Attorney, Agent, or Firm*—Mintz, Levin, Cohn, Ferris, Glovsky and Popeo, P.C.

(57) ABSTRACT

Computer implemented processes and software products generate profiles of entities, such as providers, clients, merchants and customers, and entities comprising interacting pairs of entities. The processes including deriving direct profiles from transaction data pertaining to an entity and enhancing the profile of one entity using the profile of another entity. Parallel and serial applications of the derive and enhance processes on various individual and multiple entites yields enhanced profiles that powerfully describe the interactions and relationship of the entities to each other, and between their members.

45 Claims, 9 Drawing Sheets

PROFILE (DERIVE & ROLLUP)

CASCADE

ENHANCE

Median number of root canals per client

703 — Count number of root canals for each provider-client pair

705 — Preserve variable

707 — Compute median over all clients for given provider

What percent of a provider's clients are hospitalized ?

803 — Count number of hospitalizations for each client

803 — Tag clients with hospitalizations

805 — Preserve variable

807 — Compute percent of clients tagged, for each provider

What percent of client's overall $-activity does provider account for, on the average?

903 — Compute $-activity for each client
909 — Compute $-activity for each provider/client pair
905 — Compute ratio of above two quantities for each provider client pair
907 — Compute average of this ratio across all clients for given provider

CASCADED PROFILES FOR MULTIPLE INTERACTING ENTITIES

CROSS REFERENCE TO RELATED APPLICATION

This application claims priority under 35 USC §119(e) from provisional application Ser. No. 60/146,209, filed on Jul. 28, 1999, which is incorporated herein in its entirety.

BACKGROUND OF THE INVENTION

1. Technical Field

The present invention related generally to creating statistical models of transactional behavior, useful, for example, for detecting aberrant behavior of individuals or organizations, and more particularly to forming profiles of various entities and combinations of entities for development of such statistical models.

2. Background of the Invention

In many real-world problems involving prediction, detection, forecasting and the like, the problem setting consists of the interactions between different entities such as individuals, organizations or groups. In such cases, the activity related to the problem at hand is largely described by a body of transaction data (historical and/or ongoing) that captures the behaviors of the relevant entites. Examples of such problems abound in everyday life. A few sample settings along with the corresponding transaction data and related entites are described below in Table 1.

TABLE 1

| Problem/Setting | Transactions | Entities |
| --- | --- | --- |
| Healthcare fraud and abuse detection | Claims (inpatient and outpatient) | Client (Patient), Doctor, Hospital, Pharmacy, Lab |
| Credit Card fraud detection | Purchases, Payments, Non-monetary transactions | Account holder, Merchant, Credit Card issuer |
| Bank Checking System | Check processing transactions | Account holder, Bank, Teller |
| Food Stamp fraud detection | Food Stamp transactions | Retailer, Client |

In each of these settings, the common phenomenon is the fact that the encounters between the different entities are captured in the form of the associated transactions.

An entity is an operational unit within a given setting, application or environment and represents objects that interact within that setting, application or environment. The members of an entity are generally objects of a similar type. Different entities interact with each other and their interactions are encapsulated in the transaction data corresponding to that application. Thus, examples of entities in a healthcare setting are clients, providers (this includes doctors, hospitals, pharmacies, etc.), clients' families, etc. and their interactions are captured in the claims data; i.e. the interaction of a healthcare provider and a patient is captured in a claim by the provider for reimbursement. In the credit card world, the interacting entities are account holders, merchants, credit card issuers, and the like and their interactions are captured through different types of transactions such as purchases and payments.

Usually, entities correspond to individuals or organizations that are part of the setting, as the examples in the previous paragraph illustrate. However, more abstract entities characterizing a transaction may also be defined. Examples include procedure codes (describing the type of healthcare service rendered), disease groups and SIC codes (Standard Industry Codes).

The member of an entity is an individual instance of the entity. For example, a specific doctor is a member of the healthcare provider entity, a particular grocery store is a member of the credit card merchant entity and so on.

A target entity is the primary entity of interest for a given application. Usually, it is the focus of some type of analysis such as a statistical model or a rule. A target entity interacts with other entities through the transactions. Thus, in provider fraud and abuse detection, the helathcare providers are the target entity while the clients (patients), clients' families, other providers, etc are the entites interacting with the target entity. In credit card fraud, the merchant would be one example of a target entity (depending upon the type of fraud being analyzed) and the interacting entities then are the cardholder, the credit card issuer, etc. Alternatively, a point of sale terminal could be another type of target entity, and the cashiers who use the terminal would be the interacting entities.

As noted above, a transaction captures the information associated with an interaction beween a group of entities. A transaction may initially arise between two entities (e.g. a doctor and a patient) and then be processed by still other entities (e.g. a pharmacy providing a prescription and a laboratory providing a lab test required by the doctor). Different types of transactions will typically capture different types of interactions or interactions between different groups of entities. For example in the credit card setting, a purchase transaction captures the interaction between the cardholder and the merchant, while a payment transaction encapsulates the information regarding the payments made by a cardholder to the credit card issuer. Similarly, in healthcare, an outpatient claim represents the service received by a client (i.e. patient) from a provider as part of an office or home visit, while an inpatient claim encodes data regarding a patient's stay at a hospital or another facility.

The word "profile" literally means "to draw in outline". In the context of the present invention, the word "profile" is used to denote a set of behavioral features (profile variables) that figuratively represents the "outline" of an entity. A profile may be understood as a summary of the historical (and/or ongoing) transactional behavior of the entity, which ideally eliminates the need to store the details of all the historical transactions that are summarized by the profile variables. The values of the profile variables can be used to characterize the different members belonging to that entity. The primary intention of a profile is to capture the behavioral characteristics of an entity's members as exhibited through the transactions, in as complete a manner as possible.

In order to perform a meaningful analysis in settings that are described by a large number of transactions (and supporting data), a rich characterization of the target entities based on their transactional activity is required. This process has two key aspects—
defining a set of profile variables for an entity, and
setting up a process to derive the values of these variables for each member of the entity using the relevant set of transactions.

The profile variables that are thus defined and derived for an entity constitute that entity's profile, that is, constitute a summary of the entity's behavior. Thus, for instance, to build a model that assesses the risk of healthcare providers performing fraudulent/abusive activity, it is desirable to first define characteristics that would help distinguish fraudulent providers from legitimate providers and then build profiles for each provider that include their respective profile variables, derived from the relevant transactions, here claims. The method of transforming the raw transaction data into meaningful behavior features is significant to the effectiveness of any analysis that uses the derived features.

Each profile variable for an entity captures some aspect of the entity's behavior as observed through the transaction data. The comprehensiveness of a profile is determined by the diversity and depth of its profile variables.

A profile variable of an entity may be generally defined as follows:
A formulation that converts data from a set of transactions involving the entity to a scalar quatity that summarizes some aspect of that entity's transactional activity.

Typically, a profile variable is derived by applying a distributional or statistical function to a series of numbers extracted either directly from the entity's transactions, or indirectly through an intermediate profile dataset. Note that a profile and hence a profile variable is generated for each individual member of an entity (e.g. in the case of healthcare providers, a profile will be generated for each individual provider). While the formulation of the profile variable is the same across all members of an entity, the value of the profile variable differs from one member to another depending on the specific transaction activity of the specific member. For example, one doctor (member of a healthcare provider entity) will likely have a different average number of services per month than another doctor (a different member).

The simplest general example of a profile variable for an entity is the number orf transactions. This is derived by applying the summation function to the series of numbers created (from the transaction dataset) by associating an indicator variable that is set to 1 for transactions in which the particular member of the entity is involved and set to 0 for all other transactions.

The specific set of profile variables that should be included in a profile is highly dependent on the application that the profiles are going to be used for. However, even though the interpretation and the relevance of the variables depends on the specific problem at hand, the general definition above applies to any setting, and enables the construction of a common framework through which profile variables may be derived. Common techniques and formulations cna be used to derive variables that have different interpretations in different environments.

For example, consider the healthcare application where the transaction is a claim, the entity is a healthcare provider and the profile variable is the average dollars paid to the provider per claim. This variable would typically be derived by summing the field in each transaction containing the dollar amount for that transaction, across all transactions of a member (provider) and then dividing by the total number of transactions for that member (provider).

Now consider the credit card environment, where the cardholder is an entity and each transaction represents a purchase made by a cardholder. Applying the same type of formulation (i.e. total spent by cardholders for all purchases divided by number of purchases) yields the average dollars spent by a cardholder each time the card is used for a purchase. If instead of the dollar amount, the field contained the time passed since the last transaction, then the same computation yields the average time between purchases for the cardholder. Although these are simple examples, they serve to illustrate the fact that the same mathematical formulation may be applied to derive profile variables in different settings for different entities.

In the past profiles have been created for individual entities and used to devlop statistical models based solely on the profiles of the invidual entities. For example, U.S. Pat. No. 5,819,226 discloses, among other things, the use of profiles of individual credit card account holders for modeling credit card fraud by such individuals. While this approach is useful for particular applications, in other applications it is desirable to understand the complex interactions between different entities. Accordingly, profiles based only on transactions of individual members of the entity are insufficient to capture these rich interactions between entities in a manner that yields statistically useful information for modeling the interactions between entities.

SUMMARY OF THE INVENTION

The present invention provides a refined and modular approach to deriving profiles from transactional data that enables an in-depth characterization of any target entity. The approach is based on profiling not only the target entity itself, but also other entities that interact with the target entity via transactions. This includes profiling the interacting pairs of entities themselves as entities. The profiles of different entities are merged and rolled-up in appropriate logical steps to produce a sophisticated set of features describing the activity of the target entity. Anyd esired profile variable (i.e, a behavioral feature based on the transactional data) for a given entity can be derived through this process. The result of this process is a cascaded profile that describes and summarizes the historical transaction patterns of multiple interacting entities, such as the transaction patterns of entity pairs (e.g., the transaction pattern of a particular provider and client together). The cascaded profile provides summary level statistics that are not available merely by summarizing transactions across a single individual entity, but only arise out of the interactions of multiple entities.

The present invention may be embodied as a software implemented process, executing on a conventional computer, or a software product on a computer readable medium, which controls the operations of a computer and which includes functional modules which provide the processes to derive, rollup, merge, and enhance profiles, or as part of a computer system. The present invention may be used in processes and systems to generate profiles for developing predictive statistical models of the transactional behavior of one or more entities, and in processes and systems to generate profiles for predicting or categorizing transactional behavior of such entites.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been princiaplly selected for readability and instructional purposes, and may not have been selected to delineate or circumscribe the inventive subject matter, resort to the claims being necessary to determine such inventive subject matter.

Figure 1:
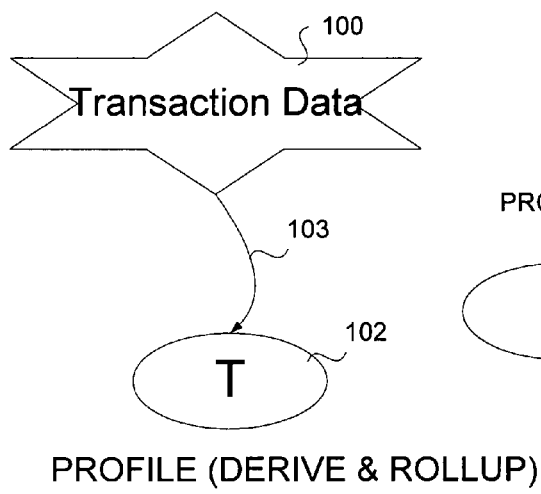
FIG. 1 illustrates the process of deriving a profile for a target entity.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Before describing the profiling process and system in detail, it is useful to consider how the profiles for an entity may be utilized. Once profiles have been derived for an entity of interest, they can be used in a variety of ways depending on the problem at hand. For any predictive application, the profiles of the relevant entities can be used in developing the predictive model. Thus, for fraud and abuse detection, the profile variables can be used as inputs to detection models to rank-order entities based on degree of suspicion. Particular profile variables may also be used to construct rules that capture known fraudulent characteristics. In other problems, rules may be used to select entities with certain desired characteristics: e.g., credit card holders who have a certain level of spending in a certain industry group. For problems where entities need to be grouped according to their characteristics, the profiles can be used to cluster individuals within an entity into meaningful groups. In healthcare, this technique can be used to group providers based on their case mix, by using their clients' profiles.

The above examples illustrate how the conversion of the raw transaction data into a comprehensive profile for each entity provides a powerful tool for performing different kinds of analyses and developing useful rules and predictive models. The following sections describe the process by which the transaction data for an application can be used to produce a summary of the target entity's activity that takes into account, not only the activity of the entity itself, but also the complete activities of all entities interacting with the target entity.

Profile Construction Process

The process of constructing a profile for a given entity has two aspects-the first is the design or definition of the profile, i.e., determining the set of summary variables that will constitute the profile for the given entity. The second is the computation of the profiles for all members of the entity, i.e., computing values for the defined set of summary variables for all members of the entity.

The determination of the specific profile variables to be included in an entity's profile for a given problem is highly dependent on the specific problem at hand. Obviously, the profile variables used in different settings will have different interpretations. Even within the same setting, different sets of variables may be used for different problems. For example, in healthcare, the set of provider profile variables relevant to a fraud and abuse detection problem may be different from ones that enable utilization predicitons. One example set of profile variables defining a particular type of profile is been listed below. Those of skill in the art of statistical modeling will be readily able to apply known techniques to the selection of variables for any particular application of the invention described herein.

However, as explained above, it is also true that even if the specific categories and quantities used and the particular statistical measures used may be different for different problems, the common framework to capture summary features of interacting entities as detailed below, can be readily applied.

Profiling a Single Entity (Direct Profile)

The goal of the profile construction process is to develop a profile for a given entity (henceforth referred to as the target entity), that is concise with respect to the transaction data from which it is derived (i.e., which contains substantially less data than all of the transactions which it summarizes, but may still include many, e.g., several hundred, variables), which offers a deep and comprehensive description of the target entity, and which describes the historical patterns of the entities and interacting groups (e.g., pairs) of entities, which patterns would not be apparent in any particular transaction of a single entity. The accuracy and effectiveness of any technique that utilizes these profiles depends on the quality of the derived variables that constitute the profile. This section outlines a direct profiling process for a single entity and explains the terminology involved. This direct process forms the basic unit of the cascaded profiling process described in a later section.

FIG. 1 depicts the most direct process of profile derivation in which the transaction data is converted to a profile for the desired (target) entity. This simple profiling process is now considered with a level of detail that will facilitate the discussion of deriving a more sophisticated profile.

A general transaction representing an interaction between different entities can be represented by a set of fields that identify each of the entities, attributes of the interaction, and their respective values. For example, Table 2 illustrates this general transaction format for a transaction record.

TABLE 2

Example Transaction Record

| Entity ID 1 | ... | Entity ID N | Trx Date 1 | ... | Trx Date M | Category 1 | ... | Category K | Quantity 1 | ... | Quantity n |
|---|---|---|---|---|---|---|---|---|---|---|---|

The transaction data may be raw, in that it is the form fo the transaction in the data received from the underlying processing system(s) of the application under consideration; or it may be processed, such as selecting certain records of formatted in a particular manner. As shown in Table 2, a transaction typically contains identifiers for the members of the various entities interacting in the particular transaction, various date fields associated with or supporting the transaction data, and various category and quantity fields that encapsulate the activity that took place through the particular transaction. Those of skill in the art will appreciate that when implemented in a database the actual record format may differ considerably from the above. For example, only category data may be used, or likewise only quantity data may be tracked. Likewise, if transaction date is not of interest, it need not be included. The representation of entities using ID values may be in other formats, again as appropriate for the application to which the profiling process is being applied.

For ease of depiction, in the following discussion, a transaction dataset 100 is considered that has two interacting entities—here called Provider and Client. There are two date fields (Date of Service and Client Date of Birth), one Category field (Procedure Code) and one Quantity field (Dollars Paid). Such a transaction will depict each encounter when a Provider served a Cliend, the date on which the service was done, the procedure code denoting the treatment provided and the amount of dollars that were paid to the Provider for that service. Note that this example of a transaction dataset is a particular instance of the general type of a transaction shown above, but it has at least one of each of the field types for illustration purposes. Again, in a particular application, either category fields or quantity fields may be used; both types are not necessary.

Thus, a typical transaction dataset for the above example may be as follows.

TABLE 3

| Provider ID | Client ID | Client Date of Birth | Date of Service | Procedure Code | Dollars Paid |
|---|---|---|---|---|---|
| P1 | C1 | Apr. 12, 1967 | Dec. 1, 1998 | 001 | $26.87 |
| P1 | C1 | Apr. 12, 1967 | Mar. 4, 1999 | 001 | $26.87 |
| P1 | C1 | Apr. 12, 1967 | May 7, 1999 | 002 | $19.35 |
| P1 | C2 | Jul. 18, 1980 | Feb. 15, 1998 | 003 | $2.33 |
| P1 | C2 | Jul. 18, 1980 | Feb. 20, 1998 | 004 | $26.03 |
| P2 | C3 | Nov. 24, 1970 | May 27, 1999 | 014 | $68.75 |
| P2 | C3 | Nov. 24, 1970 | Aug. 3, 1999 | 005 | $38.75 |
| P3 | C4 | Sep. 16, 1952 | Feb. 6, 1998 | 002 | $19.35 |
| P3 | C5 | Mar. 2, 1981 | Jan. 18, 1999 | 001 | $26.87 |
| P3 | C5 | Mar. 2, 1981 | Jan. 19, 1999 | 006 | $3.53 |
| P3 | C5 | Mar. 2, 1981 | Jan. 20, 1999 | 007 | $146.46 |
| P4 | C1 | Apr. 12, 1967 | Nov. 17, 1998 | 008 | $15.25 |
| P5 | C6 | Oct. 13, 1963 | Apr. 4, 1999 | 009 | $700.00 |
| P6 | C4 | Sep. 16, 1952 | Sep. 23, 1998 | 010 | $11.56 |
| P6 | C4 | Sep. 16, 1952 | Oct. 22, 1998 | 011 | $175.00 |
| P6 | C4 | Sep. 16, 1952 | Nov. 24, 1998 | 012 | $22.80 |
| P7 | C8 | May 28, 1975 | Jul. 12, 1998 | 006 | $3.53 |

TABLE 3-continued

| Provider ID | Client ID | Client Date of Birth | Date of Service | Procedure Code | Dollars Paid |
|---|---|---|---|---|---|
| P7 | C8 | May 28, 1975 | Aug. 3, 1998 | 013 | $0.47 |
| P8 | C7 | Jun. 2, 1961 | Jun. 25, 1999 | 001 | $26.87 |

Note that in this dataset, there are multiple transactions for many of the Providers, and multiple transactions for many of the Clients.

In, FIG. 1, the profiling process 103 transforms the transaction data 100, such as shown above, into a new target entity dataset 102 that has one record for each member of the entity T; the target entity dataset 102 is labeled "T" for the target entity it represents. This dataset 102 provides a profile of each member of T. Here, entity T refers to the class of instances that define a particular entity. For example, where entity T is the class of healthcare providers, then each doctor, etc. is a member of T. The newly created dataset 102 includes a number of summary features, i.e., profile variables. For example, the target entity data 102, when derived from the transaction data shown above represents a summarized dataset that may have the following form or content:

TABLE 4

| Provider ID | Profile Variable 1: No. of services | Profile Variable 2: Total $ Paid | ... | Profile Variable X: $ per claim |
|---|---|---|---|---|
| P1 | 5 | $101.45 | ... | $20.29 |
| P2 | 2 | $107.50 | ... | $53.75 |
| P3 | 4 | $196.21 | ... | $49.05 |
| P4 | 1 | $15.25 | ... | $15.25 |
| P5 | 1 | $700.00 | ... | $700.00 |
| P6 | 3 | $209.36 | ... | $69.79 |
| P7 | 2 | $4.00 | ... | $2.00 |
| P8 | 1 | $26.87 | ... | $26.87 |

Note that for each provider member (e.g. P1, P2, . . . ) there is one record which contains the profile variables, summarized over a number of other entities, here different clients of each provider.

Figure 11:
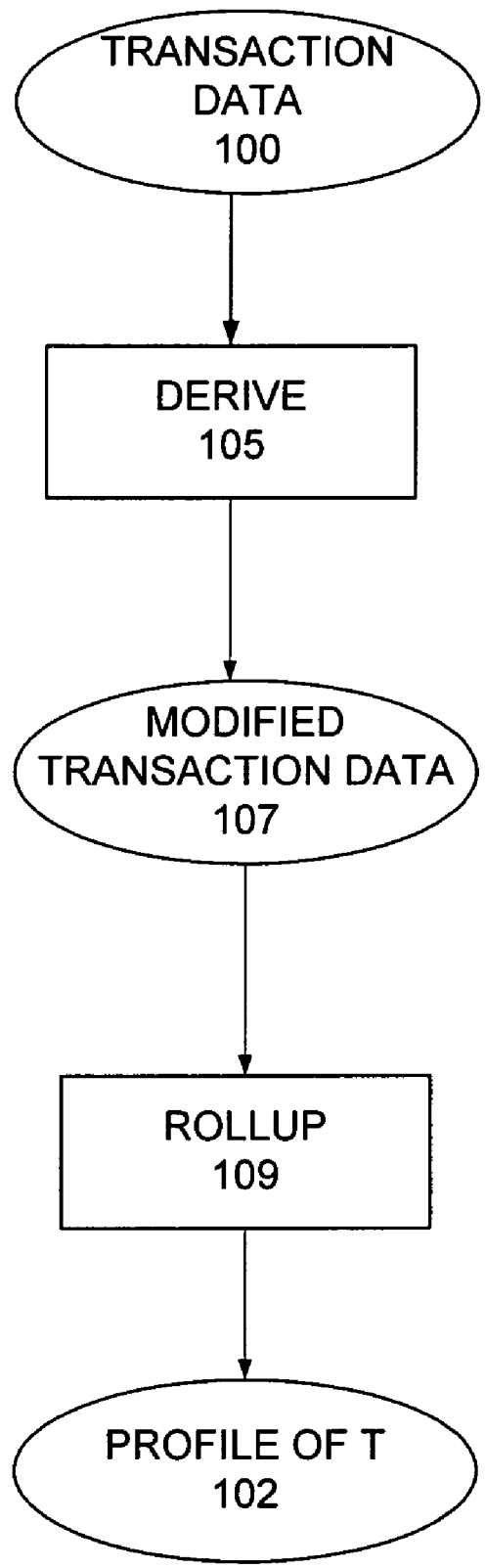
FIG. 11 illustrates the derived and roll-up processes of the enhance pocess.

This profiling process 103 that converts the transaction data 100 to the profile data 102 can be broken down into two processes, as illustrated in FIG. 11:

1) Derive Process 105; and

2) Roll-up Process 109.

1. Derive Process The derive process 105 can be defined as the process of combining one or more fields within a given dataset to produce an enhanced set of variables for each row in the dataset. Thus, the derive process modifies some fields (i.e., the columns in a data table, such as Table 3) and adds some others in each observation, but the number of observations (e.g., rows in Table 3) remains the same as in the original dataset. Hence when the derive process is applied to the transaction data, it creates an enhanced set of transactions 107 that have additional and modified fields compared to the original raw data dields. Thus, during the derive process 105, all of the individual transactions are still preserved as distinct transactions with the additional derived fields added to each transaction (and potentially some fields being eliminated, e.e. if they contribute to a derived field).

Examples of variables that can be generated by the derive process in the above illustration are as follows. The age of the client at the time fo the claim can be derived by computing the difference between the date of service and the client date of birth. The procedure codes can be grouped together and thus the procedure code group category will be an additional field in each transaction. These new values become new fields added to each observation.

Thus, for example, at the end of a derive process 105, the enhanced transaction data 107 for the above set of raw transactions (in Table 3) may look as follows:

TABLE 5

| Provider ID | Client ID | Client Age (years) | Date of Service | Procedure Code | Procedure Code Group | Dollars Paid |
|---|---|---|---|---|---|---|
| P1 | C1 | 31.66 | Apr. 12, 1998 | 001 | 1 | $ 26.87 |
| P1 | C1 | 31.92 | Apr. 12, 1999 | 001 | 1 | $ 26.87 |
| P1 | C1 | 32.09 | Apr. 12, 1999 | 002 | 1 | $ 19.35 |
| P1 | C2 | 17.59 | Jul. 18, 1998 | 003 | 7 | $  2.33 |
| P1 | C2 | 17.61 | Jul. 18, 1998 | 004 | 9 | $ 26.03 |
| P2 | C3 | 28.52 | Nov. 24, 1999 | 014 | 6 | $ 68.75 |
| P2 | C3 | 28.71 | Nov. 24, 1999 | 005 | 6 | $ 38.75 |
| P3 | C4 | 45.42 | Sep. 16, 1999 | 002 | 1 | $ 19.35 |
| P3 | C5 | 17.89 | Mar. 2, 1999 | 001 | 1 | $ 26.87 |
| P3 | C5 | 17.90 | Mar. 2, 1998 | 006 | 8 | $  3.53 |
| P3 | C5 | 17.90 | Mar. 2, 1999 | 007 | 5 | $146.46 |
| P4 | C1 | 31.62 | Apr. 12, 1998 | 008 | 6 | $ 15.25 |
| P5 | C6 | 35.50 | Oct. 13, 1998 | 009 | 5 | $700.00 |
| P6 | C4 | 46.05 | Sep. 16, 1998 | 010 | 1 | $ 11.56 |
| P6 | C4 | 46.13 | Sep. 16, 1998 | 011 | 4 | $175.00 |
| P6 | C4 | 46.22 | Sep. 16, 1998 | 012 | 9 | $ 22.80 |
| P7 | C8 | 23.14 | May 28, 1998 | 006 | 8 | $  3.53 |
| P7 | C8 | 23.20 | May 28, 1999 | 013 | 3 | $  0.47 |
| P8 | C7 | 38.09 | Jun. 2, 1998 | 001 | 1 | $ 26.87 |

Note that the enhanced transaction dataset 107 shown above had one field added (the Procedure Code Group category) and one field modified (the Client Date of Birth was replaced by the Client Age at the time of the claim). These particular fields are merely exemplary to establish the basic principles of the derive process, and any number of fields can be thus added/modified depending on the raw data fields available and the nature of the derived variables.

2. Roll-up Process After the derive process 105, the second step in the direct profile construction 103 is the roll-up process 109. The roll-up process 109 is done with respect to a certain entity (termed the roll-up entity). In FIG. 1 above, the roll-up entity is the target entity T as indicated by the label T on the dataset 102.

In general, the roll-up process in computing a single profile variable includes applying a (distributional) function (to one or more fields), across all the observations for each member of the roll-up entity (class), thus converting the corresponding data across all the observations into a single scalar quantity. This scalar quantity represents the value of the profile variable for that member. The roll-up process is applied successively to each profile variable to obtain the entire set of desired profile variables for the roll-up entity.

In pseudo-code, the roll-up process when there are E members in the roll-up entity and X number of profile variables, may be represented as follows

```
do e = 1 to E // for each member e in the dataset
   do i = 1 to X // for each profile variable
      Profile Variable e-i = f_i (Field i_1, . . . , Field
         i_m) e //value of profile variable i for
         member e is based on function f_i specifically
         defined with respect to a number of fields i_1
         through i_m of the record, using data from
         member e's record.
   end
end
```

Thus, the values of the profile variables for each member of the target entity represent a summary or roll-up of their activity as captured by the transactions. The simplest kinds of profile variables correspond to performing counts, sums and averages ont he transaction data. Examples of profile variables resulting from such simple roll-ups, for the provider entity corresponding to the above illustration include: total number of services to all clients, total dollars paid for all clients, total number of clients seen, dollars paid per service, dollars paid per client, number of services per procedure code, etc.

More complex profile variables can be obtained by (a) applying other distributional functions to the transaction data, and (b) applying selection criteria to a member's transactions based on one or more fields, before applying the function $f_i$. Examples of (a) for the above illustration can be computing the $90^{th}$ percentile of the dollars per claim for each provider. Examples of (b) would be computing total dollars paid for services with Procedure Code Group 1.

Applying the derive process 105 and roll-up process 109 as described above, results in the conversion of the raw transaction data in Table 3 to the profile dataset for the target entity as depicted in Table 4.

Profiling Interacting Entities

The previous section illustrated and described the direct process of deriving a profile for a single roll-up entity (where the resulting profile datasets 102 comprise one observation for each member of the entity), from a dataset 100 where each member fo the entity may have multiple observations. This simple direct process can be used as the basic unit in developing a methodology to create a profile for a target entity entity by building profiles for multiple interacting entities in a cascaded sequence. This methodology is one aspect of the present invention and is described below. The terms derive and roll-up as described in the previous section are used with the same meaning in this section.

As noted earlier, in order to obtain a comprehensive progile of the target entity, it is useful to not only to profile the target entity directly, but also to incorporate the characteristics of other entities that the target entity interacts with, in a given setting. Take the healthcare example, where the target entity is the provider (examples of providers are doctors, phamacists, hospitals, etc.) and one of the interacting entities is the client. Then, in order to understand the types of clients seen by the provider (case-mix), and to provide context for the interaction between the provider and a given client, a comprehensive profile of the client and each provider/client pair also needs to be developed.

Thus, profiling target entities preferably involves analyzing all transactions involving the interacting entities, and not just the transactions corresponding to the target entity. This can be accomplished by constructing a cascaded process including serial and parallel applications of the direct profiling (derive and roll-up) process described above.

Enhance Process—An additional type of process used in creating these cascaded processes is termed the enhance process. The enhance process is a sequential combination of three processes-a merge process, the derive process, and the roll-up process, where the derive and roll-up processes are as described above and are optionally included as part of the enhance process. The merge process is described next.

Figure 2:
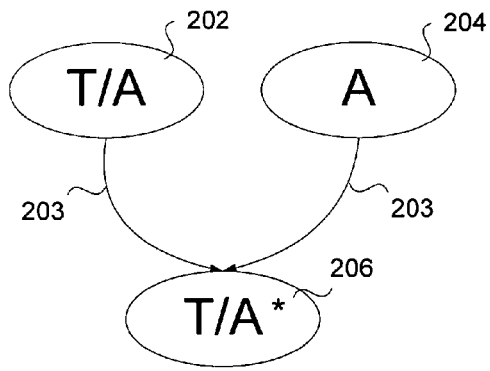
FIG. 2 illustrates the process of enhancing a profile of a target entity.

Merge Process—The merge process comes into play when data from two profile datasets for two different entities are combined to create a single profile dataset. FIG. 2 shows a schematic of this process. Consider two interacting entities T and A, with T being the target entity. Then, within a transaction, the interacting pair of T and A (designated "T/A") can itself be considered an entity and profile variables can be constructed for this pair as an entity using the same direct profiling process 103 that would be used for the individual entities T and A. The profile dataset 202 for the interacting pair entity T/A is produce by the profiling by the profiling process 103, and includes one observation for each member-pair of T and A that interacted with each other (i.e., were part of the same transaction, such as the specific provider and client in a healthcare transaction). Similarly, the profile dataset 204 for the entity A contains one observation for each member of entity A (e.g., for each client of a provider) and is derived using profile process 103 on the transaction data 100, with entity A as the target. Then, given the two profile datasets 202, 204 represented by T/A and A, the merge process of combining the two datasets in the following manner, to produce an enhanced profile dataset T/A*206. The "*" designation indicates an enhanced profile dataset, and the dual arrows into an enhanced dataset indicate the enhance process 203.

Each observation in the T/A dataset 202 is expanded to include the fields from the A dataset. The values in these fields correspond to the values for that member of the entity A which is part of the member-pair in the T/A dataset for any given observation.

This process is illustrated by the following example. Table 6 shows a sample T/A profile 202 dataset and the set of X profile variables making up the profile of the T/A entity. Table 7 shows a sample A profile dataset 204. Table 8 then shows the result 206 of the merge process being applied to the two tables.

TABLE 6

| Entity T TD | Entity A ID | TA-1 | ... | ... | TA-X |
|---|---|---|---|---|---|
| T1 | A1 | <value> | ... | ... | <value> |
| T1 | A2 | <value> | ... | ... | <value> |
| T2 | A1 | <value> | ... | ... | <value> |
| T2 | A3 | <value> | ... | ... | <value> |
| T2 | A6 | <value> | ... | ... | <value> |
| T3 | A4 | <value> | ... | ... | <value> |
| T4 | A4 | <value> | ... | ... | <value> |
| T4 | A5 | <value> | ... | ... | <value> |
| T5 | A2 | <value> | ... | ... | <value> |

Here, TA-1 through TA-X are the set of X profile variables making up the profile of the T/A entity.

TABLE 7

| Entity A ID | A-1 | ... | ... | A-Y |
|---|---|---|---|---|
| A1 | <value> | ... | ... | <value> |
| A2 | <value> | ... | ... | <value> |
| A3 | <value> | ... | ... | <value> |
| A4 | <value> | ... | ... | <value> |
| A5 | <value> | ... | ... | <value> |
| A6 | <value> | ... | ... | <value> |
| A7 | <value> | ... | ... | <value> |

Here, A-1 through A-Y are the set of Y profile variables constituting the profile of the A entity.

TABLE 8

| Entity T ID | Entity A ID | TA-1 | ... | TA-X | A-1 | ... | A-Y |
|---|---|---|---|---|---|---|---|
| T1 | A1 | <value> | ... | <value> | <value> | ... | <value> |
| T1 | A2 | <value> | ... | <value> | <value> | ... | <value> |
| T2 | A1 | <value> | ... | <value> | <value> | ... | <value> |
| T2 | A3 | <value> | ... | <value> | <value> | ... | <value> |
| T2 | A6 | <value> | ... | <value> | <value> | ... | <value> |
| T3 | A4 | <value> | ... | <value> | <value> | ... | <value> |
| T4 | A4 | <value> | ... | <value> | <value> | ... | <value> |
| T4 | A5 | <value> | ... | <value> | <value> | ... | <value> |
| T5 | A2 | <value> | ... | <value> | <value> | ... | <value> |

Thus, all of the A-1 . . . A-Y records have been inserted into the appropriate T/A records. For example, in Table 8, the first row is for a transaction between T1 and A1: the values for variables TA-1 through TA-X are taken from Table 6, and the values for variables A-1 through A-Y are taken from row 1 in Table 7, where member A1's values are listed. (Noted, that "A1", "A2", etc., refer to members of entity A, while "A-1" . . . "A-X" [with the dash] refer to variables).

Going back to the flowchart in FIG. 2, the arrows pointing into the T/A* dataset 206 represent the enhance process 203, which includes a merge process (as illustrated in FIG. 2). It may also include a derive process and a roll-up process in that sequence (the derive and roll-up processes are used in FIG. 3 in enhance process 305).

More particularly, as shown above, the merge process 203 creates an enhanced dataset 206, such as shown in Table 8. Then, for each observation in this dataset, the derive process may be used to create modified and additional profile variables for the entity T/A. This enhancement is only possible because the profile variables for the A entity have been combined with the T/A profile variables by the preceding merge process 203. If necessary, these variables can then be rolled-up 109 to the roll-up entity (e.g., to the T or A entity). In this case, the roll-up is not necessary, since the resulting table from the merge and derive processes is already at the T/A level.

Cascaded Profiling

The foregoing sections have described all of the components that can be used to create a refined cascaded profiling process for building profiles for target entities.

Figure 3:
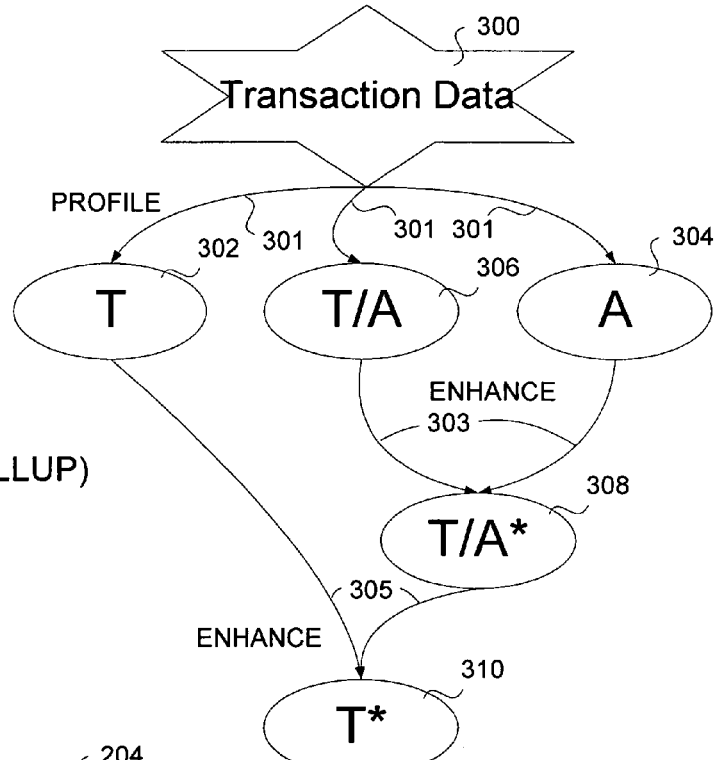
FIG. 3 illustrates cascaded profiling.

A basic building block of the cascaded profiling process is created by considering the interaction of the target entity T with any other entity A. FIG. 3 illustrates the three stages involved in the cascaded profile derivation.

Stage 1. Develop direct profiles by applying the profiling process 301 (including derive and roll-up) to transform the transaction level data 300 into profiles for the particular entity for the target entity T (T profile dataset 302), the entity A with which entity T is interacting (A profile dataset 304), and the paired entity formed by the interactions of T and A (T/A profile dataset 306).

Stage 2. Apply the enhance process 303 to the T/A and A profile datasets 304, 306 from Stage 1 to obtain an enhanced T/A profile dataset (T/A*profile 308).

Stage 3. Apply the enhance process 305 again to the T profile dataset 302 from Stage 1 and the enhanced T/A* profile dataset 308 from Stage 2, to obtain the enhanced T* profile dataset 310. In this process the merge, derive, and roll-up processes are applied. The roll-up moves from the T/A dataset 308, which has one record for each T/A combination to the T* dataset 310, which has one record for each target entity.

Figure 5:
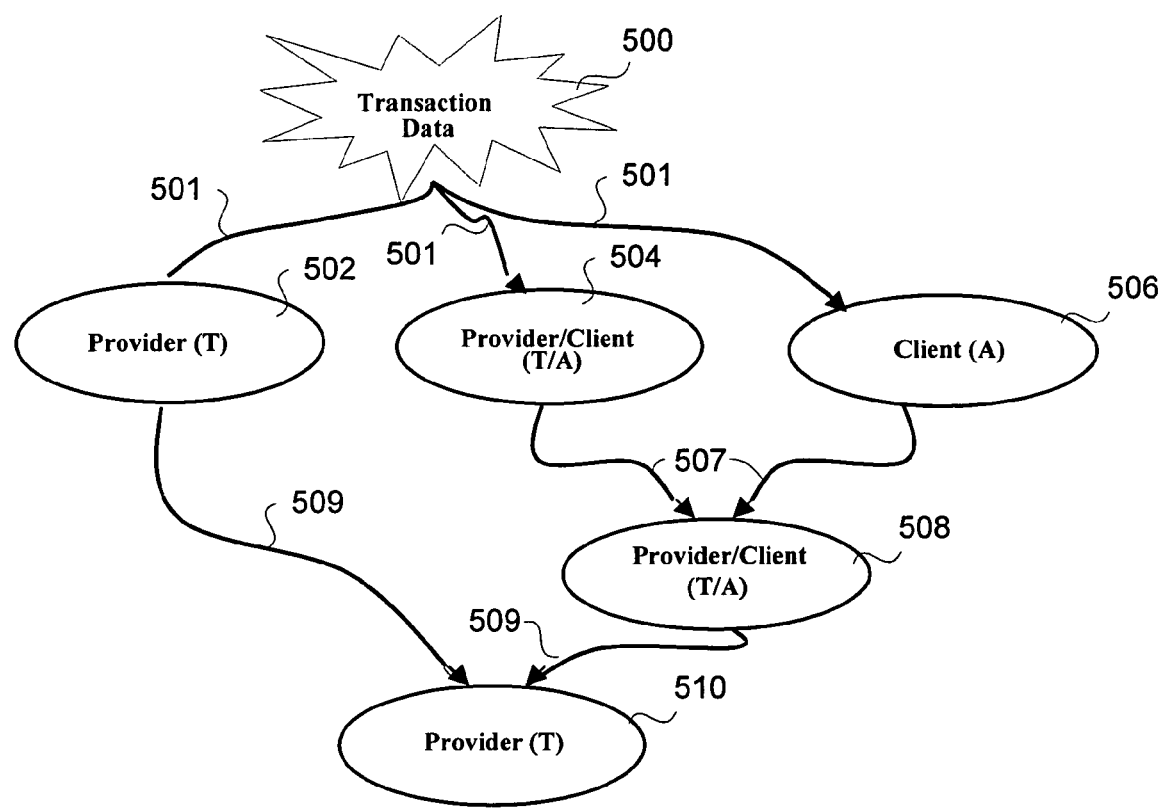
FIG. 5 illustrates an example of cascaded profiling in a healthcare application with Providers and Clients.

FIG. 5 depicts this building block process with the example of the target entity T being the Providers and the interacting entity A being the Clients that the providers serve, in a healthcare setting.

Figure 4:
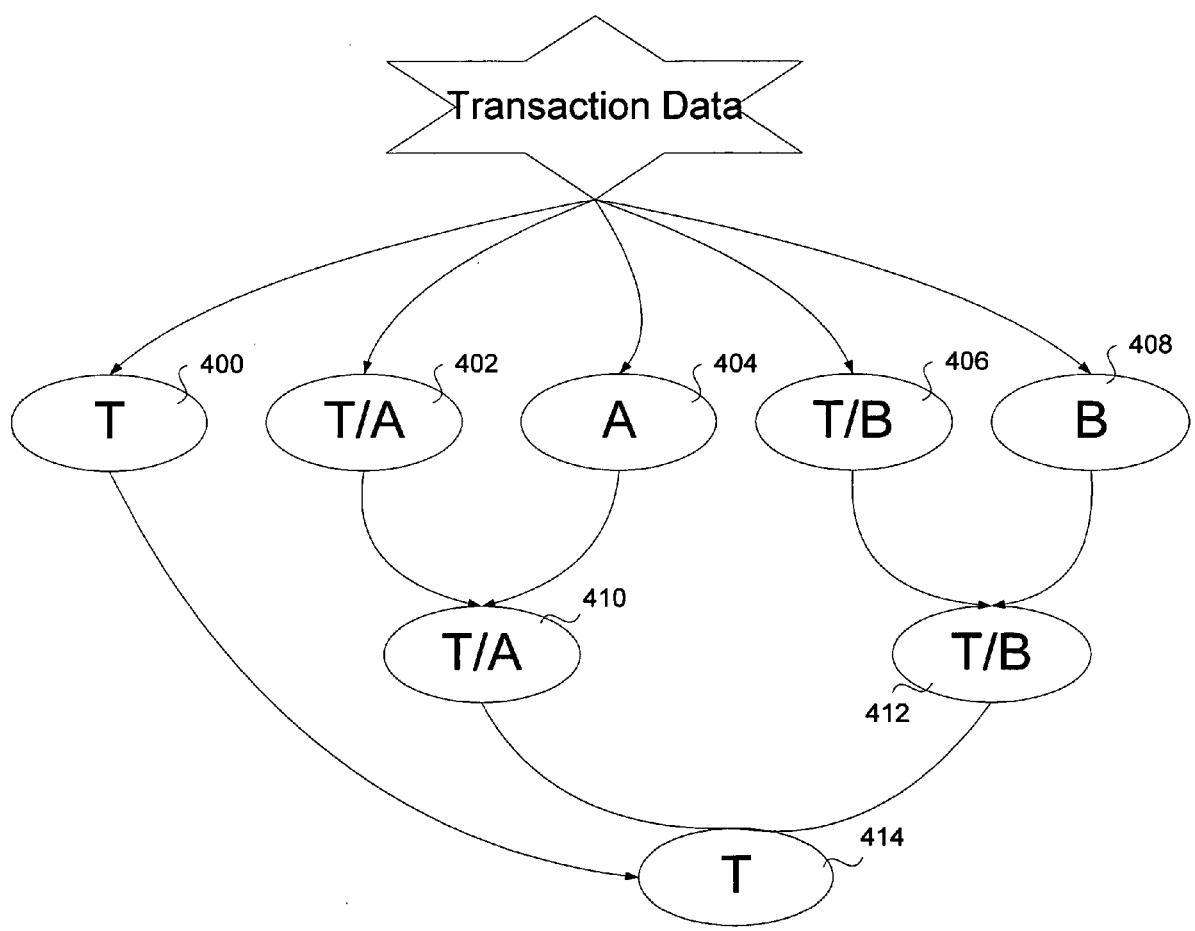
FIG. 4 illustrates a more complex example of cascaded profiling, using multiple interacting entities.

The cascaded process shown in FIGS. 4 and 5 is accomplished by making multiple passes through the transaction data to compute features based on each different entity. On each pass, new features are computed, using any features that have been computed on previous passes. Features computed on entities that interact with the target entity are merged in and/or rolled up to get a more comprehensive picture.

Referring again to FIG. 5, there is shown datasets for the various entities being profiled, here Provider profile dataset 502, Provider/Client profile dataset 504, Client profile dataset 506. In each dataset, each member belonging to the given entity for the dataset has a single observation of record comprising a number of variables. Thus, in the Provider dataset 502, each individual provider has one observation, comprising variables summarizing that provider's activity. Similarly, in the Provider/Client dataset 504, there is one record for every interacting Provider-Client pair.

A single arrow pointing into a dataset denotes the process of direct profiling the available data to the level of that entity, by applying a combination of the derive and roll-up processes, as explained above. Thus, for example, profiling process 501 is applied to Transaction Data 500 with respect to the target entity of Providers, to summarize information for each individual provider across all the transactions corresponding to that provider, hence creating a direct profile of each provider, which profiles are stored in Provider profile dataset 502. Examples of variables that could be created in this process for each individual provider are total dollars paid to the provider, average dollars paid per transaction, average number of transactions per month by the provider, etc. Likewise, direct profiling 501 is applied to the Transaction Data 500 on each Provider/Client pair to produce Provider/Client dataset 504, and on each client, to produce Client dataset 506.

As noted above, when there are two (or more) arrows pointing into the same dataset, it denotes the process of applying the enhance process to combine data from two different data sources, with respect to the given entity. This includes applying the merge process followed by an optional derive process and an optional roll-up process. This results in combinations of certain variables from the different data sources to produce enhanced profile variables (see below for examples). Thus, enhance process 507 is applied to Provider/Client dataset 504 and Client dataset 506, to merge the records from these datasets with respect to each Provider/Client pair (i.e., for each interacting Provider/Client pair, the data for the corresponding client from the client dataset 506 gets replicated into the data of the Provide/Client member), thus resulting in a dataset 508 with a single record for every pair of Provide/Client members.

The entire process shown in FIG. 5 can thus be described as follows. On the first pass through the Transaction Data 500, the data is sorted by Provider and provider-based features like average dollars per claim, distribution of activity across procedure code groups, client age groups, etc. are computed. This creates the provider profiles in Provider dataset 502. However, to enhance our understanding of the Provider, it is desirable to understand the client interactions that the Provider has had, and indeed the clients that the Provider has interacted with. Hence, the transaction data 500 is sorted by each Client, to compute client features like number of different Providers seen in a given day, total volume of services/dollars, procedure mix, etc., thereby creating client profiles in Client dataset 506. In a third pass, the transaction data 500 is sorted by each Provider-Client pair and variables based on the Provider-Client entity, such as total number of services, total dollars per pair, mix of procedures performed, etc. are computed, thereby creating Provider/Client dataset 504. Note that these three passes are completely independent of each other (except for the fact that they use the same transaction data 500 as input, although sorted differently) and could be performed in parallel.

The client and provider-client features are then combined 507 by the enhance process to produce an enhanced Provider/Client dataset 508 of provider-client variables. For example, by dividing the total number of services for a given Provider-Client pair by the total number of services for a given client, the percent of the client's activity that is done by the given provider can be computed.

Finally, the provider variables in the topmost Provider dataset 502 and the enhanced provider-client variables in the Provider/Client dataset 508 are merged 509 by provider and then rolled up across all clients seen by a given provider to produce an enhance Provider profile dataset 510. For example, a variable that captures the percentage of a given provider's clients seeing other providers on the same day that the given provider is visited can be computed at this step and may reveal cases of "pink-ponging" (i.e., fraud schemes where nearby providers collude in fraudulent/abusive activity by performing unnecessary services on each other's clients).

This final step results in a profile for the provider that not only contains summaries of the transaction data for an individual provider, but also incorporates the summary of activity at the client level and the provider-client level into the description of the providers' activity.

While the description above has focused on the interaction between a provider and a client, it is by no means restricted to these entities. In fact, for the various settings described in the introduction, the above process could be applied to profile any target entity using its interaction with another entity, e.g., Merchant and Cardholder in credit card application, Retailer and Client in Food Stamp processing or Account holder and Bank in check processing.

Adding other Interactions

Using the above cascading process as a building block, the profile of a target entity can be expanded to account for its interactions with other entities as well. For instance, consider that the target entity T interacts with two kinds of entities, A and B. Then for each of A and B, the interactions with T are profiled as described above. These are then merged, along with the direct roll-ups for entity T.

FIGS. 1, 2, 3 and 4 depict the progression of constructing an increasingly sophisticated profiling process. FIG. 1 shows the direct profiling of the transaction data to the level of the target entity T and is the initial step. FIG. 2 illustrates how the interactions of T with another entity A can be profiled, as was described aboce for the provider-client entities. FIG. 4 expands the profile 414 of T to another level by incorporating via an enhance process the interaction of T with both A and B, fron the T/A and T/B profiles 410, 412 of interacting entity pairs, T/A and T/B. In this manner, the basic building block of the profiling process can be replicated with different entities to obtain an increasingly comprehensive profile for the target entity T.

Dynamic Profiling: Adding the Time Component

Dynamic profiling is a process that enables the updating of a profile with new transactional data without requiring the reprocessing of all the existing transactions for which a profile has been derived. Thus, dynamic profiling takes the current profile, plus the new transactional data as inputs and produces an updated profile that encapsulates the entire known transactional history of the entity. The ability to maintain information about events that transpired long ago without actually going back to the historical transactions has major implications when the profiling system is deployed in a production setting. One advantage of this process is that there is no need to access years of transactional data on each production cycle, thus enabling significant savings in capacity of storage needed as well as time for computation.

The profiling process described above can be applied in a dynamic setting, so that profiles are created on an ongoing basis and can be used to perform analysis at regular intervals of time.

Profile Variables

The profiling process described above is a means to the end of deriving meaningful variables that capture different aspects of an entity's activity. The kinds of variables that will be useful will depend on the particular application for which the profiling process is used.

The following is a list categories of variables for detection models targeting provider fraud and abuse in healthcare. These illustrate the types of variables that can be derived through the profiling process described above. Although the specifics (such as the specific categories and quantities) will change in other application areas (such as merchant-consumer transactions), the spirit/technique of these variables can be applied to these other applications as well. For example, the technique of deriving procedure mix variables can be applied to deriving industry (or SIC code) mix variables in the credit card or food stamp settings.

Note that most of the measures described can not only be computed directly for the provider, but can also be computed at the provider-client and/or client level and then rolled up to the provider via the process described preciously. Examples of such variables are illustrated below. Also, the dynamic profiling concept can be applied so that these measures are computed for a certain period of time (e.g. monthly) and updated dynamically for each new time period (e.g. at the end of each month).

The example variables include:

Procedure Mix. This measures the relative amount of activity (services, dollars, etc.) a provider has in each procedure category. Categories are defined by experts (e.g., ICD9 codes) and/or by a clustering process (e.g., data driven classification). Actual input variables typically encode a provider's mix relative to peers.

Age Group Concentration. This measures the activity (number of clients, dollars billed/paid, number of services, procedure mix) in each age group relative to peers.

Single Day Activity. This measures the frequency and magnitude of very-high activity days.

Monthly Activity. This includes a wide variety of general activity measures (volume measures) at the month level. Distribution of monthly activity that may be unusual with respect to the peer group can be captured by these features.

Quarterly Activity. Similar to monthly variables, but tracked on a quarterly basis.

Group Particpation. Identifies providers that are part of a group practice. This provides important context for interactions with other variables.

Client Consecutive Monthly Visits. This describes the frequency with which the same client visits the provider.

Per Day Activity. This provides a general measure of the provider's daily activity levels. Typically includes number of services/day, dollars-paid/day, clients/day as well as dollars-per-client/day and umber-of-services-per-client/day.

Per Client Activity. This measures the total activity per client over an extended period.

Multiple Providers Same Day. This measures the degree to which the provider's clients receive services from other providers whenever they recieve services from the given provider.

Ratios of Procedure Categories. This includes ratios of one category of service to another category (for example, long office visits to short office visits, or stainless-steel crowns to pulpotomies).

In most cases, input features are normalized with respect to a provider's peers. Peers may be defined by specific data fields (such as declared specialty and geographic location) or by a data-driven methodology that assigns providers to peer groups based upon what they do, and not what they have declared as a specialty.

Examples of Profile Variables

The following examples depict how the cascaded profiling process described above can be used to compute some typical profile variables.

Figure 6:
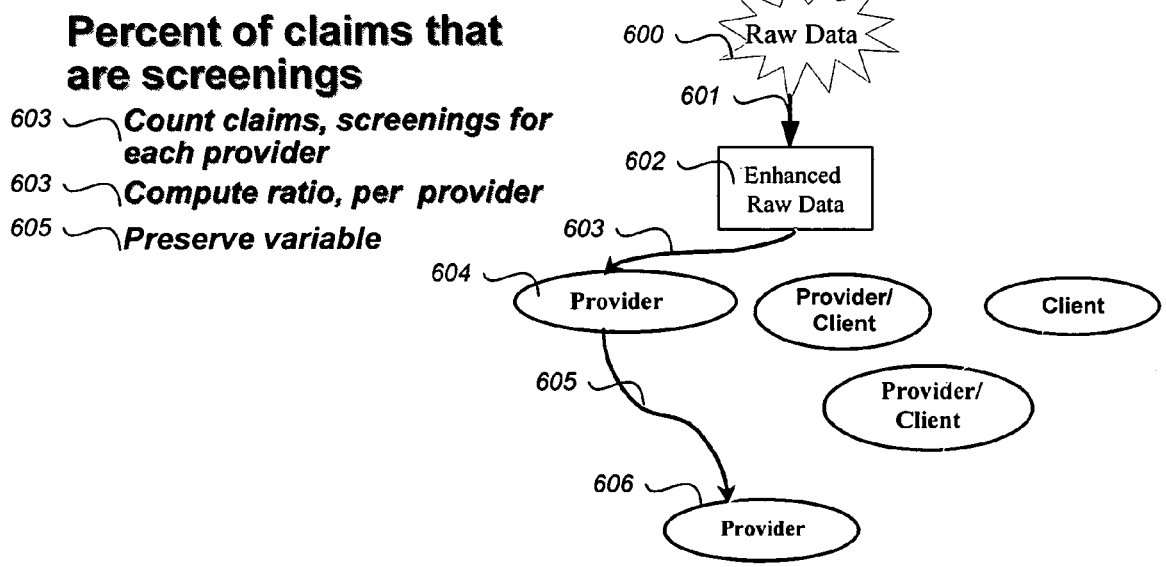
FIGS. 6-9 illustrate various examples of profile variable derivation.

FIG. 6 depicts, in terms of the data processing previously described, the deviation of a simple provider variable, the percent of a provider's claims that are screenings. Raw data is processed in a derive step 601 to produce the enhanced raw data 602. The data flow line 603 from enhanced raw data 602 to the first provider dataset 604 to the bottom provider dataset 606 in the data flow diagram, shows the lines along which the variable gets computed and transferred to the final dataset 606. In enhance process 603, a roll-up process counts the number of claims and the number of screenings for each provider, and a derive process computes the ratio of these counts, again, per provider. Enhance process 605 simply preserves the variable, since it is already at the provider level.

As mentioned before, many of the same variables that describe provider behavior or client behavior can also be used to describe the activity that occurs between a specific client and a specific provider. The difference is only in the entity on which the calculation is based. For example, the procedure mix, single-day activity, monthly activity, quarterly activity, conesecutive visits, per-day activity, multiple providers same day, and ratios of services all apply to the provider/client pair.

The importance of the provider-client variables is that they enable the expansion of the provider or client profile. Thus if the provider is the target entity, the provider-client variables can first be merged with the client-based profile and then rolled-up to the provider level to obtain distributions of various activities characterizing the provider's client interactions. Similarly, if the client is the target entity, the same provider-client variables are first merged with the provider's profile and rolled-up to the client level to obtain distributions of various activities characterizing the client's interactions with different providers.

Figure 7:
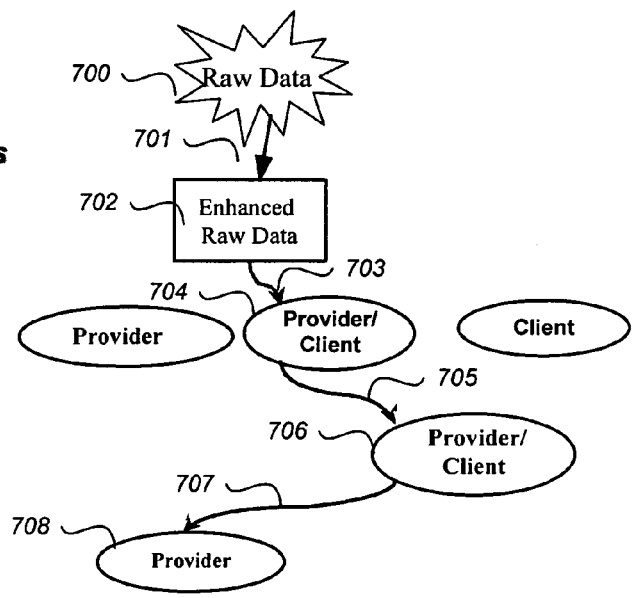

FIG 7 depicts, in terms of the data processing, the derivation of a variable characterizing a particular provider-client activity. Here, the profile variable is median number of root canals performed on each client by each provider. The number of root canals for each provider-client pair is obtained via an enhance process 703, resulting in the Provider/Client dataset 704. The variable is preserved in the enhance process 705 and becomes part of dataset 706. Then the median number of root canals for each provider is computed by a further enhance process 707, using the enhanced Provider/Client profiles 706 to produce the Provider profiles 708.

Client activity typically spans several different providers. Again, many of the same variables that we compute for providers or provider/client pairs apply to clients. These include distributions of activity across different procedure groups, per-day and per-claim activity variables, etc. It is further possible to compute additional client-specific variables, such as the number of different providers seen on a single day.

Figure 8:
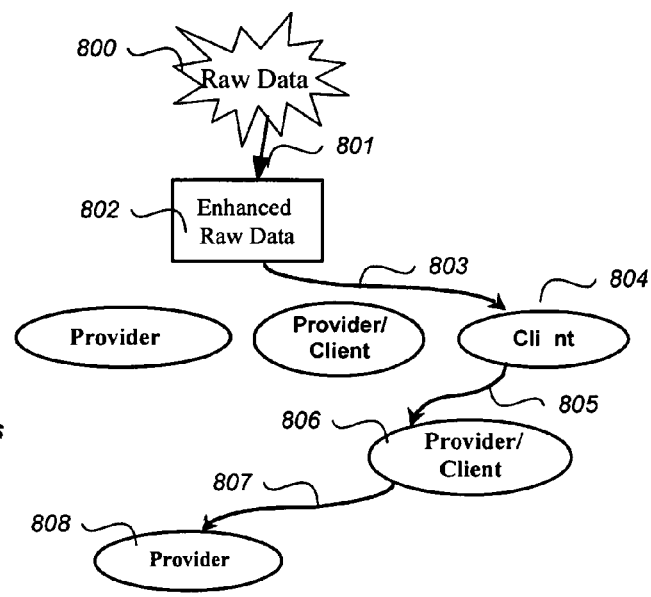
Figure 9:
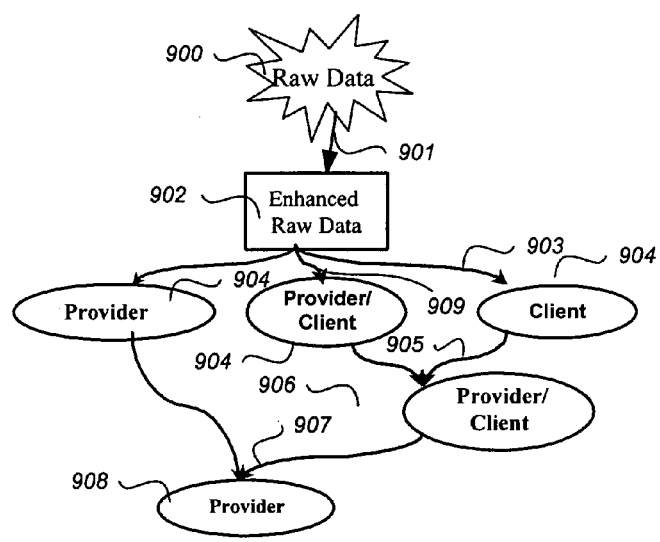

FIGS. 8 and 9 depict, in terms of the data processing, the characterization of clients and how this information is used to derive provider variables.

FIG. 8 shows how to calculate the percentage of a provider's clients that are hospitalized. Using the enhanced raw data 802, the number of hospitalizations for each client are counted and any client with hospitalizations is tagged in derive and roll-up process 803, resulting in the client dataset 804. The enhance process 805 preserves the tags. Finally the data is rolled-up to the Provider level and the percentage of tagged clients is calculated for each provider in enhance process 807, resulting in the Provider dataset 808.

FIG. 9 illustrates a more complex profile variable. For any provider/client pair, that provider represents some percentage of that client's activity (measured in dollars). For a given provider, one can ask what percentage of activity that provider represents for his/her clients, on average. FIG. 9 shows how to calculate that average. Derive and roll-up process 903 sums the total dollar activity for each client, resulting in client dataset 904. Derive and roll-up process 909 sums the dollar activity for each provider/client pair, resulting in provider/client dataset 904. Enhance process 905 first merges the provider/client and client datasets and then computes the percentage of each client's activity corresponding to each provider/client pair. This variable becomes part of the enhanced provider/client dataset 906. Derive and roll-up process 907 computes the average of those percentages across all clients for each provider, creating the provider dataset 908.

Client variables capture the combined activity of all providers that delivered services to the client. On the other hand, Clietn/Provider variables capture each specific provider's activity with the client. For example, assume Client-x received services from 5 different providers (Providers A-E). For any given feature or activity, we can compute variables for Client-x, and analogous variables for x-A (Client x, Provider A), x-B, x-C, x-D and x-E. Ratios, such as 'x-A'lx reveal a single provider's contribution to the overall activity involving the client.

Once there is computed features describing how each client has interacted with each of the providers from which they have received services, these can be combined to obtain a better overall view of client activity.

For example, we can compute variables such as total number of services, total dollars billed for services etc. for each of the client/provider pairs (x-A, x-B, x-C, x-D, and x-E). Once we have these computed, we can roll up these values by client or provider, by taking the average across all five, or the maximum, etc. This information tells us something more than the total number of services and the total dollars billed for the client across all providers. Because they capture different aspects of client activity, it is useful to include both the across-all-providers version of the variable and the rolled-up version in models of provider and client activity. Two clients may have identical "across all providers" values (e.g., both clients spent $1,000 on services in a given year), but very different rolled-up values (for example, one client may receive all $1,000 worth of services from a singl provider, thus an average of $1,000 per provider, while another receives $100 worth of services from 10 different providers, and thus an average of $100 per provider).

A pre-computed set of features that describe client/provider pairs can be rolled up to build a better description of the specific client. Similarly, a pre-computed set of features describing a provider's clients helps us build a better description of the provider. Knowing that Provider-A's client base includes an unusually large proportion of elderly clients with high illness severity provides important context within which we can interpret other variables. For example, a high dollars-per-service may be cause for concern if the provider's client-base is normal, but reasonable for a client-base with high proportion of elderly clients.

Rolled-up client variables may also provide direct evidence of fraud and abuse. Examples include: clients that repeatedly receive services from the same set of providers on the same day, or clients that have a non-repeatable service (like a specific tooth extraction or an appendectomy) performed multiple times.

Some variables identify patterns that are dependent upon the order or timing of an event. Because the date-of-service (and/or date-of-processing) are typically included on each transaction, it is possible to reconstruct the sequence of events as they occurred. These time- dependent and event-dependent and event-dependent variables can be computed as part of the overall multi-pass process described above.

Concepts requiring variables that consider the "order of events" include:
- services delivered to the same client in consecutive months;
- client visits to multiple providers on the same day;
- checks of appropriate servie-patterns (e.g., x-rays to be taken prior to treatment, services to be done before a surgery).

Although, for the sake of consistency, all of the above examples have used terminology that is relevant to healthcare applications and in particular, the variables discussed are geared towards fraud and abuse detection, the same techniques can be used to derive relevant variables for other entities and different applications.

Using the Derived Profile

Once the profiles for the target entity set have been computed using the processes described above, they can be used in a variety of different ways, including:
i) As inputs to predictive models for detection or forecasting;
ii) As characterizations of the entities in a clustering process;
iii) As components of a focused rule or query for selection, detection, etc.

Figure 10:
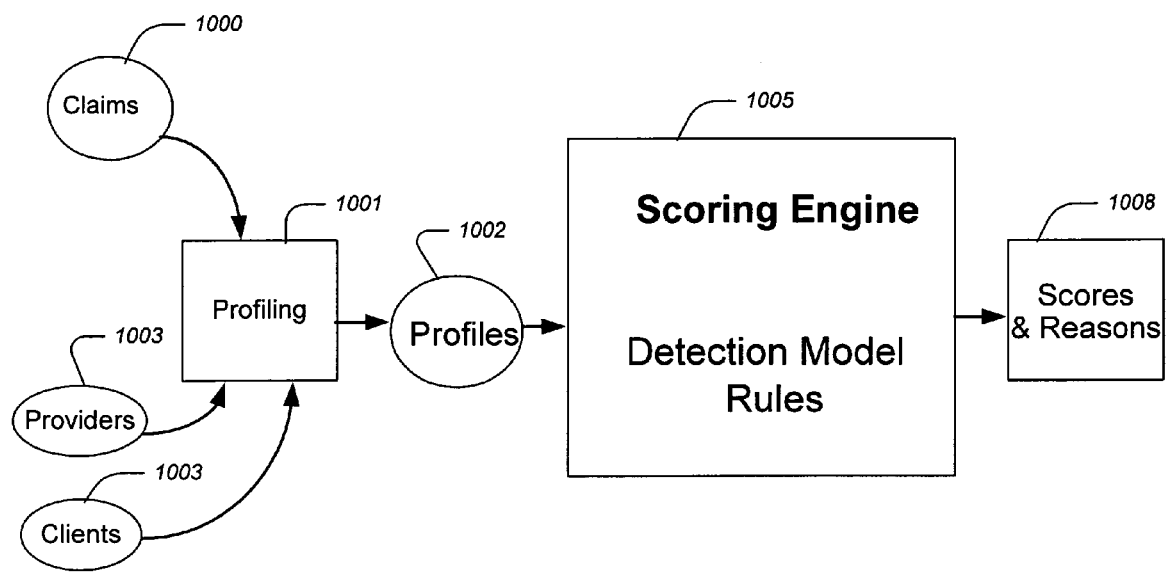
FIG. 10 illustrates a system of using cascaded profiles in a scoring engine.

FIG. 10 depicts how the profiling technique would fit into a general detection system deploying predictive model and rules.

The raw transaction data 1000 (e.g., claims) along with required supporting information 1003 about the entities (e.g., Providers and Clients) is input to the Profiling process 1001, including the cascading features described above. The profiling process 1001 converts the raw data 1000 into a set of behavioral features (a set of profiles 1002, including cascaded profiles) computed for each of the target entities. These profiles 1002 are then input to a scoring engine 1005 that represents the deployment of a prdictive model and rules (which were themselves developed and trained based on sample transaction data, and profiles for a representative population). The scoring engine 1005 uses the profile variables as inputs to generate the appropriate scores 1008 and associated reasons which are then output to the user.

As will be understood by those familiar with the art, the invention may be embodied in other specific forms without departing from the spirit or essential characteristics thereof. For example, the particular steps of implementing and effecting the direct profile process, the enhance process, the merge process or the rollup process may depart from that described and illustrated, to include more or fewer steps that achieve substantially the same effects. Likewise, the particular naming of the processes, protocols, features, attributes or any other aspect is not mandatory or significant, and the mechanisms that implement the invention or its features may have different names of formats. While particularly useful in the healthcare setting, and more particularly to identifying fraud and/or abuse therein, the present invention may be used in many other applications and setting, and for different purposes outside of identifying fraud. Multiple entity profile, a profile of at least one mulitple entity defined by a combination including individual entities, is useful in any environment where an understanding of the interactions between multiple entities is desirable, such as for statistical analysis, prediction, forecasting, and so forth. Accordingly, the disclosure of the present invention is intended to be illustrative, but not limiting, of the scope of the invention, which is set forth in the following claims.

We claim:

1. A computer implemented method of generating an enhanced profile of an individual entity, the profile including for each member of the individual entity, a single observation having at least one variable describing historical transactions pertaining to that member, the method comprising the steps of:
   on a first pass through transaction data, sorting data by one single entity, defined as a target entity, computing respective variables, and creating target profiles in a target dataset;
   on a second and independent pass through said transaction data, sorting the transaction data by each member of a second and different entity, computing second and different entity variables, and creating second and different entity profiles in a second and different entity dataset;
   on a third and independent pass through the transaction data computing an entity pair variable describing interaction of said target entity and said second and different entity, and creating a target and second and different entity pair profile using said target profiles and said second and different entity profiles in a target and second and different entity pair dataset, defined as a multiple entity dataset;
   responsive to creating said target dataset, said second and different entity dataset, and said target and second and different entity pair dataset, applying an enhance process comprising combining the second and different entity variables and the target and second and different entity pair variables and producing an enhanced target and second and different entity pair dataset; and
   responsive to producing the enhanced target and second and different entity pair dataset, merging the target dataset and the enhanced target and second and different entity pair dataset by the target, rolling up across all members of the second and different entity that interacted with emmbers of the target entity, and producing an enhanced target profile dataset;
   wherein said enhanced profile dataset comprises a first entity profile that includes an activity variable that measures, for a first member of said first entity, the activity of a second member of the first entity, wherein said second member of said first entity interacts with a member of a second entity, wherein the member of the second entity had interacted with said first member of said first entity.

2. The method of claim 1, further comprising:
   providing at least one of a single entity profile, an enhanced profile, or a multiple entity profile as an input into a predictive model for predicting a transaction pertaining to an entity included in the profile.

3. The method of claim 2, wherein a member's peer group is determined by a declared specialty of the member.

4. The method of claim 2, wherein a member's peer group is determined by transactions engaged in by the member.

5. The method of claim 1 further comprising:
   providing at least one of a single entity profile, an enhanced profile, or a multiple entity profile as an input into a profile of a different entity.

6. The method of claim 1, further comprising:
   deriving from at least one of a single entity profile, an enhanced profile, or a multiple entity profile statistics which summarize transactions pertaining to an entity included in the profile.

7. The method of claim 1, wherein each profile includes a plurality of variables, and generating at least one single entity profile of an individual entity having individual members further comprises:
  for each member of an entity;
  determining a peer group of the member; and
  normalizing at least one profile variable of the entity with respect to the member's ditance from other members in the member's peer group.

8. The method of claim 1, wherein the entities are healthcare related entities.

9. The method of claim 1, wherein the entities include healthcare providers and patients.

10. The method of claim 9, wherein at least one multiple entity is a combination of a provider and a patient.

11. The method of claim 9, wherein an entity profile of a provider entity includes a procedure mix variable that measures a relative amount of activity a provider member has in each of a plurality of procedure categories.

12. The method of claim 11, wherein the amount of activity is relative to each provider member's peers.

13. The method of claim 11, wherein the procedure categories are defined by JDC9 codes.

14. The method of claim 11, wherein the procedure categories are defined by a clustering process on provider or patient historical transactions.

15. The method of claim 9, wherein an entity profile of a provider entity includes an age group concentration variable that measures activity of a provider member in each of a plurality of patient age groups relative to the provider member's peers.

16. The method of claim 9, wherein an entity profile of a provider entity includes a single-day activity variable that measures a frequency and magnitude of very-high activity days of a provider member.

17. The method of claim 9, wherein an entity profile of a provider entity includes a monthly activity variable that measures monthly activity of a provider member.

18. The method of claim 17, wherein an entity profile of a provider entity includes a quarterly activity variable that measures quarterly activity of a provider member.

19. The method of claim 9, wherein the monthly activity measure is a distribution of monthly activity of a provider member relative to the provider member's peers.

20. The method of claim 9, wherein an entity profile of a provider entity includes a group practice participation variable that identifies providers that are part of a group practice.

21. The method of claim *, wherein an entity profile of a provider entity includes a client consecutive visit variable that measures a frequency with which a same member of a client entity visits a same provider emmber in a selected period of time.

22. The method of claim *, wherein an entity profile of a provider entity
  includes a per-day activity variable that measures a provider member's daily activity
  level, according to at least one of:
  number of services per day;
  total dollars-paid per day;
  number of clients per day;
  total dollars-per-client per day; or
  number-of-services-per-client per day.

23. The method of claim 9, wherein an entity profile of a provider entity includes a per-client activity variable that measures a provider member's activity level with respect to individual client entity members over a selected time period.

24. The method of claim 9, wherein an entity profile of a provider entity includes a multiple providers activity variable that measures, for each provider member, the activity of other provider members who provide services to clients of the provider member on a same day that the provider member provides services.

25. The method of claim 9, wherein an entity profile of a provider entity includes a ratio of procedure categories variable that measures for a provider member at least one ratio of one category of service provided by the provider member to another category of service provided by the provider member.

26. The method of claim 9, wherein an entity profile of a client includes a variable that measures an activity level of a non-repeatable service provided to a client member.

27. The method of claim 9, wherein an entity profile of an entity includes a variable that describes transactions of entity members with respect to the order fo the transactions over time.

28. The method of claim 1, wherein the entities include a healthcare related facility.

29. The method of claim 1, wherein the entities include a healthcare claims processor.

30. A computer implemented method of generating a profile of an entity, the profile including for each member of the entity, a single observation having at least one variable describing historical transactions pertaining to that member, the method comprising the steps of:
  providing a direct profile process that generates a direct profile of an entity having members, from historical transactions of the members of the entity;
  performing multiple applications of the direct profile process with respect to distinct entities, including at least one multiple entity comprising a combination of individual entities and interacting pairs of entities to produce respective an individual entity profile and a multiple entity profile;
  responsive to said performing multiple applications of the direct profile process, performing an enhance process that enhances the profile of a first entity using a profile of a second entity, wherein said enhance process computes an entity pair profile describing interaction of said direct profile and said individual entity profile; and
  responsive to performing the enhance process, performing at least one application of the enhance process to enhance the profile of a multiple entity with the profile of a single entity by combining observations in the multiple entity profile that have a common member in the single entity profile;
  wherein an interacting pair of entities is itself an entity.

31. A computer implemented method of generating an enhanced profile of a 1st entity, the 1st entity having a plurality of members, the enhanced profile of the 1st entity including for each member of the 1st entity, a single observation having at least one variable describing historical transactions pertaining to that member, the method comprising the steps of:
  providing a direct profile process that generates a direct profile of an entity having members, from historical transactions of the members of the entity;
  performing an enhance process that enhances the profile of an entity using a profile of another entity by combining portions of observations of the entities that have a common member;
  responsive to performing the enhance process, performing multiple applications of the direct profile process with respect to the 1st, 2nd, and 3rd entities to produce respective 1st, 2nd, and 3rd profiles, wherein the 3rd entity is a combination of the 1st and 2nd entities, wherein said 1st and 2nd entities are an interacting pair of entities wherein said 3rd profile describes interaction of members of said 1st entity with members of said 2nd entity;

responsive to performing multiple applications of the direct profile process, performing an application of the enhance process on the profile of the 3rd entity with the profile of the 2nd entity to produce an enhanced 3rd entity profile; and responsive to performing the application of the enhance process of the 3rd entity, performing an application of the enhance process on the profile of the 1st entity with the enhanced profile of the 3rd entity to produce an enhanced 1st entity profile;

wherein an interacting pair of entities is itself an entity;

32. A computer implemented system of generating an enhanced profile of a 1st entity, the 1st entity having a plurality of members, the enhanced profile of the 1st entity including for each member of the 1st entity, a single observation having at least one variable describing historical transactions pertaining to that member, the method comprising:

direct profile means for generating a direct profile of an entity having members, from historical transactions of the members of the entity;

enhancing means for enhancing the profile of an entity using a profile of another entity by combining portions of observations of the entities that have a common member, responsive to the direct profile means; and means for applying the direct profile means and the enhancing means in parallel and serial applications with respect to 1st, 2nd, and 3rd entities to produce respective 1st, 2nd, and 3rd profiles, wherein the 3rd entity is a combination of the 1st and 2nd interacting pair of entities to produce direct profiles of the 1st, 2nd, and 3rd entities, and to result in an enhanced 1st entity profile using profiles of the 2nd and 3rd entities, responsive to the enhancing means.

wherein said enhanced 1st entity profile describes interactions between said 2nd and 3rd entities;

wherein an interacting pair of entities is itself and entity;

33. A computer implemented method of generating a profile of a entity, the 1st entity having a plurality of members, the enhanced profile of the 1st entity including for each member of the 1st entity, a single observation having at least one variable describing historical transactions pertaining to that member, the method comprising the steps of:

generating a 1st profile of a combination of a 1st and 2nd interacting pair of entities, from historical transactions pertaining to both the 1st and 2nd entities, the 1st profile including one observation for each combination of a member of the 1st entity interacting with a member of the 2nd entity;

responsive to generating a 1st profile of the ocmbination, generating a 2nd profile of a combination of the 2nd and a 3rd entity, from historical transactions pertaining to both the 2nd and 3rd entities, the 2nd profile including one observation for each combinationof a member of the 2nd entity and a member of the 3rd entity, wherein said 1st, 2nd, and 3rd entities comprise interacting entities, wherein both said 1st profile and said 2nd profile describe interactions between said 1st, 2nd, and 3rd entities; and responsive to generating a 2nd profile of the combination, enhancing the 1st profile using the observations of the 2nd profile that have a same member of the 1st entity and the 2nd entity, to describe a statistical relationship between the 1st entity and the 3rd entity;

wherein an interacting pair of entities is itself an entity.

34. A computer implemented method of generating a profile of an entity, comprising the steps of:

generating a profile of a 1st entity;

responsive to generating the profile, generating a profile of at least one 2nd entity that interacts with the 1st entity through transactions with the 1st entity;

responsive to generating the profile of at least one 2nd entity, generating a profile of at least one 3rd entity comprising the combination of the interactive 1st and 2nd entities; and responsive to generating the profile of at least one 3rd entity, enhancing the profile of the 1st entity with the profile of at least one 3rd entity;

wherein an interacting pair of entities is itself an entity.

35. A computer implemented method of generating a profile of an entity, comprising the steps of:

deriving a 1st profile of a 1st entity using transactions of the 1st entity;

deriving a 2nd profile of a 2nd entity that interacts with the 1st entity through transactions with the 1st entity;

responsive to deriving the 1st profile and the 2nd profile, merging the 1st and 2nd profiles and creating a merged profiles representing an entity comprising interacting 1st and 2nd entities;

responsive to creating the merged profile, deriving a new variable from other variables of the merged profile;

responsive to deriving the new variable from other variables of the merged profile, rolling up the merged profile with respect to the new variable;

wherein an interacting pair of entities is itself an entity.

36. A computer implemented method of generating a profile of an entity, comprising the steps of:

generating a profile of a 1st entity from historical transactions of the 1st entity, said historical transactions comprising said 1st entity interacting with at least a 2nd entity, the profile containing a plurality of variables, wherein said 1st entity comprises a client and 2nd second entity comprises a provider;

responsive to generating the profile, receiving new transactions of the 1st entity; and responsive to receiving the new transactions, updating at least one variable of the profile of the 1st entity using only the at least one profile variable and the new transactions, without using the historical transactions from which the profile was generated;

wherein an interacting pair of entities is itself an entity.

37. A computer implemented method of updating a profile of an entity, the profile including for each member of the entity, a single observation having at least one variable describing historical transactions pertaining to that member, the method comprising the steps of:

performing with respect to multiple distinct entities, multiple applications of a direct profile process that generates a direct profile of an entity having members, from historical transactions of the members of each of the entities, including at least one multiple entity comprising a combination of individual entities and interacting pairs of entities, to produce respective individual and multiple entity profiles, wherein said entity having members comprises a patient, wherein said multiple entity comprises a doctor;

responsive to producing respective individual and multiple entity profiles, applying at least one application of an enhance process to enhance the profile of a multiple entity with the profile of a single entity by combining observations in the multiple entity profile that have a common member in the single entity profile;

responsive to applying the enhance process, receiving new transactions of the multiple entity; and responsive to receiving new transactions, updating at least one variable of the profile of the multiple entity using only the at least one profile variable and the new transactions, without using the historical transactions from which the profile of the multiple profile was generated;

wherein an interacting pair of entities is itself an entity.

38. A computer implemented method of generating a profile of a first entity, the profile including for each member of the first entity, a single observation having at least one variable describing historical transactions pertaining to that member, the method comprising the steps of:

generating a first profile of the entity from historical transactions pertaining to the first entity, the first profile including one observation for each member of the first entity, the observation having at least one variable summarizing the historical transactions of the member of the first entity;

generating a second profile of a second entity from historical transactions pertaining to the second entity, the second profile including one observation for each member of the second entity, the observation including at least one variable summarizing the historical transactions of the member of the second entity;

generating a third profile of a third entity comprising a combination of the interacting first and second entities, from historical transactions pertaining to both the first and second entities, the third profile including one observation for each combination of a member of the first entity interacting with a member of the second entity, the observation including at least one variable describing the transactions of the member of the first entity with respect to the member of the second entity;

responsive to generating the first, second, and third profiles, enhancing the third profile using the second profile by combining at least a portion of observations from the second profile with observations from the third profile that have a same member of the second entity, to produce an enhanced third profile; and responsive to enhancing the third profile, enhancing the first profile using the enhanced third profile by combining at least a portion of observations from the third profile with observations from the first profile that have a same member of the first entity, to produce an enhanced first profile;

wherein an interacting pair of entities is itself an entity.

39. The method of claim 38, wherein enhancing the first profile using the enhanced third profile comprises:

merging the observations from the first profile with observations of the enhanced third profile that have a same member of the first entity; and for each member of the first entity, rolling up all observations in the first profile for the member into a single observation having at least one variable describing interactions of the member of the first entity with respect to other members of the first entity.

40. The method of claim 38, wherein enhancing the third profile using the first profile by combining observations from the first profile with observations from the third profile that have a same member fo the first entity, further comprises:

merging the observations of the third profile with observations of the first profile that have a same member of the first entity; and rolling up the observations in the merged third profile with respect to each member of the first entity, to produce the enhanced third profile containing one observation for each member of the first entity, the observation including at least one varibale describing the interaction of the member of the first entity with respect to members of the second entity.

41. A computer implemented method of generating a profile of a Target entity, the profile including for each member of the Target entity, a single observation having at least one variable describing historical transactions pertaining to that member, the method comprising the steps of:

generating a Target profile of the Target entity from historical transactions pertaining to the Target entity, the Target profile including one observation for each Target entity member, the observation having at least one varibale summarizing the historical transactions of the Target entity member, wherein said Target entity comprises an account holder;

generating an entity A profile fo a second entity A from historical transactions pertaining to entity A, the entity A profile including one observation for each entity A member, the observation including at least one variable summarizing the historical transactions of the entity A member, wherein said second entity A comprises a merchant;

generating a T/A profile of a T/A entity comprising a combination of the interacting Target entity and entity A, from historical transactions pertaining to both the Target entity and A entity, the T/A profile including one observation for each combination of a Target entity member interacting with an entity A member, the observation including at least one variable describing the transactions of the Target entity member with respect to the entity A member;

responsive to generating the Target profile, the A profile, and the T/A profile, enhancing the T/A profile using the entity A profile by combining observations from the T/A profile with observations from the entity A profile that have a same entity member, to produce an enhanced T/A profile; and responsive to enhancing the T/A profile, enhancing the Target entity profile using the enhanced T/A profile by combining observations from the Target profile with observations from the T/A profile that have a same entity member, to produce the Target entity profile;

wherein an interacting pair of entities is itself and entity.

42. The method of claim 41, wherein enhancing the Target entity profile using the enhanced T/A profile further comprises:

merging the pbservations from the Target profile with observations of the enhanced T/A profile that have a same entity member; and for each entity member of the Target entity, rolling up all observations in the Target profile for the entity member into a single observation having at least one variable describing interactions of the Target entity member with respect to other Target entity members.

43. The method of claim 41, wherein enhancing the T/A profile using the entity A profile further comprises:

merging the observations of the T/A profile with portions of the observations of the entity A profile that have a same entity member; and rolling up the observations in the merged T/A profile with respect to each entity A member, to produce the enhanced T/A profile containing one observation for each entity A member, the observation including at least one variable describing the interaction of the T/A entity member with respect to entity A members.

44. A computer implemented method of generating a profile of a first entity, the profile including for each member of the first entity, a single observation having at least one variable describing historical transactions pertaining to that member, the method comprising the steps of:

generating a first profile of the entity from historical transactions pertaining to the first entity, the first profile including one observation for each member of the first entity, the observation having at least one variable summarizing the historical transactions of the member of the first entity;

generating a second profile of a second entity from historical transactions pertaining to the second entity, the second profile including one observation for each member of the second entity, the observation including at least one variable summarizing the historical transactions of the member of the second entity;

generating a third profile of a third entity comprising a combination of the interacting first and second entities, from historical transactions pertaining to both the first and second entities, the third profile including one observation for each combination of a member of the first entity interacting with a member of the second entity, the observation including at least one variable describing the transactions of the member of the first entity with respect to the member of the second entity;

generating a fourth profile including one observation for each member of the fourth entity, the observation including at least variable summarizing the historical transactions of the member fo the fourth entity;

generating a fifth profile of a fifth entity comprising a combination of the interacting first and fourth entity, from historical transactions pertaining to both the first and fourth entities, the fifth profile including one observation for each combination of a member of the first entity interacting with a member of the fourth entity, the observation including at least one variable describing the transactions of the member of the first entity with respect to the member of the fourth entity;

responsive to generating the first, second, third, fourth, and fifth profiles, enhancing the third profile using the first profile by combining observations from the first profile with observations from the third profile that have a same member of the first entity, to produce an enhanced third profile;

responsive to generating the first, second, third, fourth, and fifth profiles, enhancing the fifth profile using the first profile by combining observations from the first profile with observations from the fifth profile that have a same member of the first entity, to produce an enhanced fifth profile; and responsive to enhancing the fifth profile, enhancing the first profile using the enhanced third profile and the enhanced fifth profile;

wherein an interacting pair of entities is itself an entity.

45. The computer implemented method of claim 44, wherein enhancing the first profile using the enhanced third profile and the enhanced fifth profile further comprises:

merging the observations from the first profile with observations of the enhanced third profile that have a same member of the first entity;

merging the observations from the first profile with observations of the enhanced fifth profile that have a same member of the first entity; and for each member of the first entity, rolling up all observations in the first profile for the member into a single observation having at least one variable describing interactions of the member of the first entity with respect to other members of the first entity.

* * * * *